Figure 1:
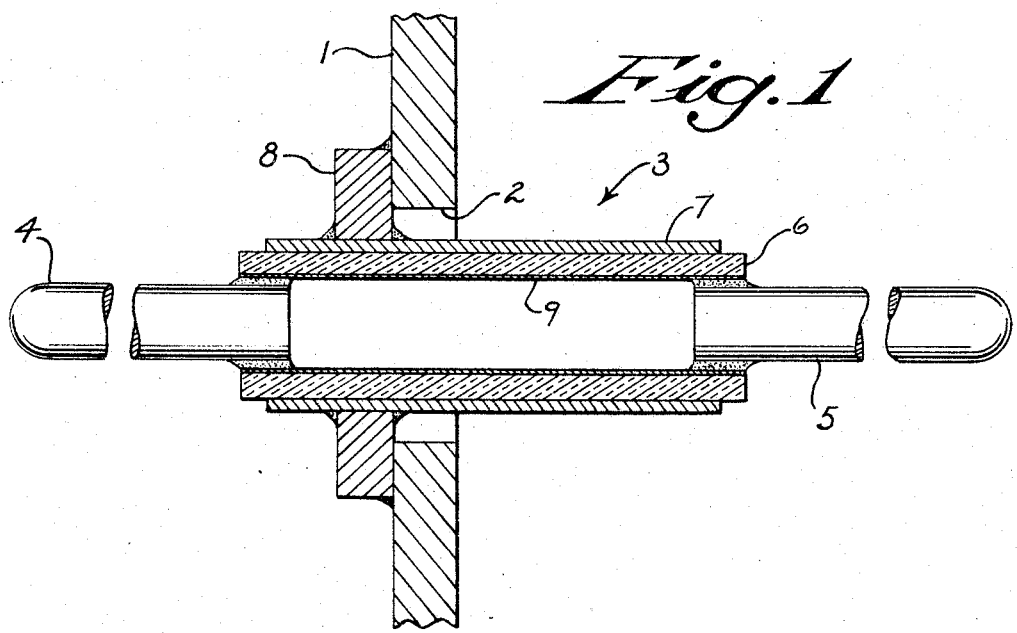

INVENTORS
HEINZ M. SCHLICKE
FLOYD A. BLOMDAHL
JOEL T. BARBIERI
ROBERT J. KOCOROWSKI

ATTORNEY

INVENTORS
HEINZ M. SCHLICKE
FLOYD A. BLOMDAHL
JOEL T. BARBIERI
ROBERT J. KOCOROWSKI
BY
Arthur H. Seidel

ATTORNEY

INVENTORS
HEINZ M. SCHLICKE
FLOYD A. BLOMDAHL
JOEL T. BARBIERI
ROBERT J. KOCOROWSKI

BY
Arthur H. Seidel

ATTORNEY

United States Patent Office 3,329,911
Patented July 4, 1967

3,329,911
LOW TRANSFER IMPEDANCE CAPACITOR
WITH RESISTIVE ELECTRODE
Heinz M. Schlicke, Fox Point, and Floyd A. Blomdahl,
Joel T. Barbieri, and Robert J. Kocorowski, Milwaukee,
Wis., assignors to Allen-Bradley Company, Milwaukee,
Wis., a corporation of Wisconsin
Filed Feb. 25, 1963, Ser. No. 260,786
6 Claims. (Cl. 333—79)

This invention relates to capacitors suitable for use at very and ultra high frequencies and it more specifically resides in a capacitor having one of its electrodes formed to produce a distributed resistance along the electrode that improves the transmission characteristics of the capacitor.

Capacitors having high $\epsilon$ ceramic dielectrics may exhibit internal resonances, when operated between 100 and 10,000 megacycles, which sharply increase the transfer impedance of the capacitors, so that they no longer function as pure capacitances and consequently become unsatisfactory. In particular, this is a specific problem in tubular capacitors used as radio frequency by-pass filters in television tuners and other shielded circuits operating in the ultra and very high frequency ranges. The usual tubular by-pass capacitor surrounds a wire feed-through conductor which carries direct current, or low frequency current, into a shielded area. An inner electrode of the capacitor is electrically joined to the feed-through conductor, and the outer capacitor electrode is joined to the shielding surrounding the area in which the radio frequencies are contained. The capacitor functions to by-pass radio frequencies traveling along the feed-through conductor to the shielding, thereby preventing escape of such frequencies from within the confines of the shielded area. Ideally, as the frequency to be by-passed increases in value the transfer impedance from the feed-through conductor to the shielding, i.e. through the capacitor, will decrease, since a capacitive impedance varies inversely with the frequency. Thus, a pure capacitance becomes more effective as a by-pass with increasing frequency, and this characteristic is desirable for handling frequencies which have the capability of readily radiating. However, wave lengths in the ceramic dielectric materials utilized in these capacitors become greatly foreshortened from the corresponding wave lengths in air, and consequently internal resonances are developed which cause the capacitors to lose a simple capacitive characteristic. This is due to the high dielectric constants of the ceramics, which are of the order of several thousand, and the fact that the wave lengths in a medium are inversely proportional to the square of the dielectric constants, wherefore resonant conditions will occur in which the transfer impedance no longer followers the simple relation $1/\omega C$. Instead, the capacitor will exhibit sharp increases in impedance in frequency bands near resonant values, and the effectiveness of the unit as a by-pass of the radio frequencies is lost.

A number of arrangements have heretofore been devised to overcome the effects of resonance. For example, in Patent No. 3,035,237 issued May 15, 1962 for "Feed-Through Capacitor" separate, spaced electrodes have been provided on one side of the dielectric to decrease resonant effects at the frequencies of operation, in Patent No. 2,944,048 issued July 25, 1961 for "High Frequency Capacitor of Corrugated Configuration" one electrode is given a corrugated appearance to create internal reflections that minimize resonance at the working frequencies, and in Patent No. 3,007,121 issued Sept. 5, 1961 entitled "Deresonated Capacitor" another special electrode geometry is shown for the same general purpose. The present invention has, for one of its purposes, not only the elimination of unwanted resonance, but also the provision of a capacitor which has a lower transfer, or bypass impedance than a pure capacitance. Hence, the invention provides a superior device that improves beyond that attainable from merely deresonating the dielectric body forming the capacitor.

In general, the invention contemplates a tubular ceramic with an inner electrode having a relatively large resistance joined to the feed-through conductor and an outer electrode of usual low resistance adapted for connection to a chassis wall. The input and output ends of the feed-through conductor are de-coupled and the circuit presented to the radio frequencies provides a ready path by-passing the conductor. In a preferred form of the invention, the inner electrode is made extremely thin to develop the desired resistance to current flow. This resistance in combination with the capacitance may be considered analogous to a distributed capacitance-resistance network along the axial length of the capacitor that exhibits a transfer impedance superior to that of pure capacitance. In forming the very thin inner electrode a metallic film is deposited on the inner wall of the ceramic dielectric that is thinner than the normal depth of current penetration in a bulk conductor of like material for the frequencies involved. This novel feature secures the necessary resistance value, and hence it may be said that the invention, in its preferred form, develops a simulated skin current effect for the inner electrode that is characterized by having the radio frequency currents in this electrode confined closer to the electrode surface than in usual constructions.

A particular advantage of the preferred form is that its electrodes do not require special configurations, so that they may be readily made at low cost. Further, they are physically rugged to withstand sharp impacts and accelerations as encountered in missile flight and the like. Accordingly, the objects of the invention include:

(1) The provision of a capacitor having a transfer impedance less than that of a pure capacitance.

(2) The provision of a capacitor that is deresonated through a range of frequencies extending as high as 10,000 megacycles.

(3) The provision of a capacitor that is extremely effective for conducting radio frequencies, while at the same time being of small size and of simple, rugged construction that may be manufactured at a satisfactorily low cost.

The foregoing and other objects of the invention will appear from the following description. In the description reference is made to the accompanying drawings, which form a part hereof, and in which there is shown by way of illustration certain embodiments of the invention. As will be apparent to those skilled in the art the invention may be incorporated in other embodiments of varying construction. Thus, the drawings are not to be interpreted in a manner of limitation, and reference is made to the claims herein for determining the scope of the invention.

Figure 2:
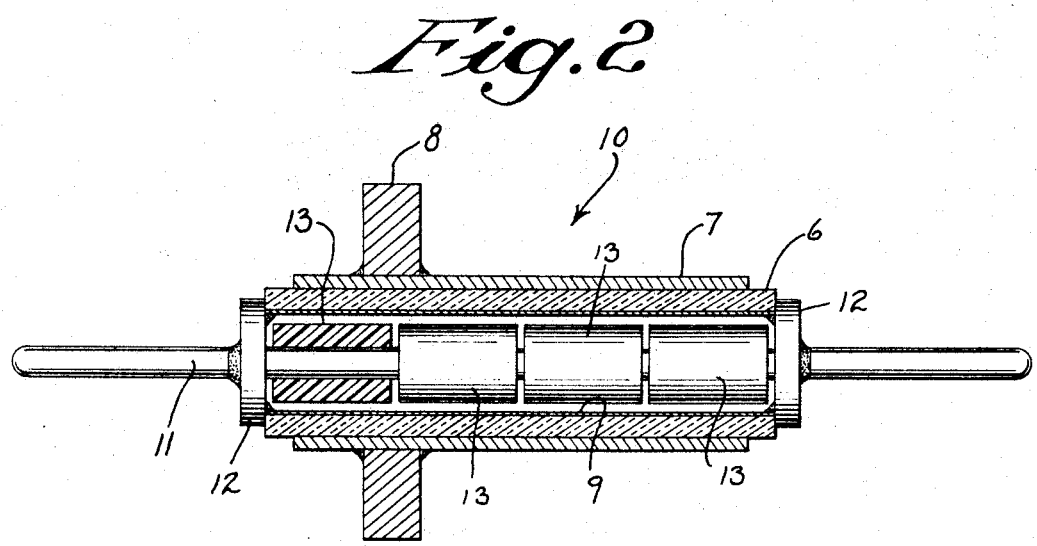
Figure 3:
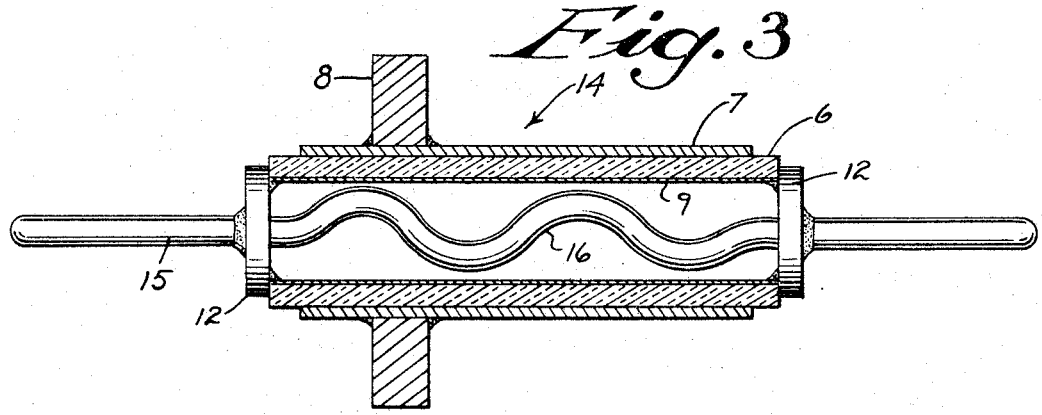
Figure 4:
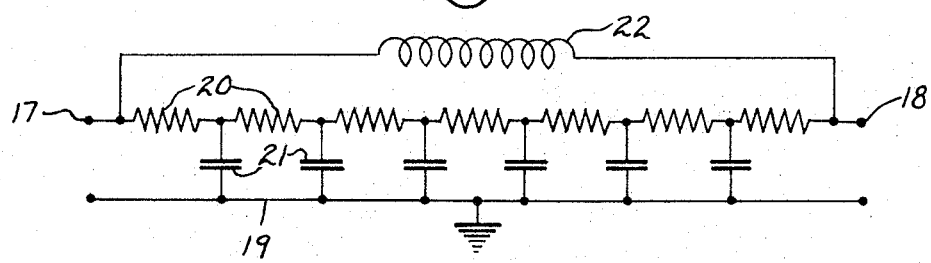
Figure 6:
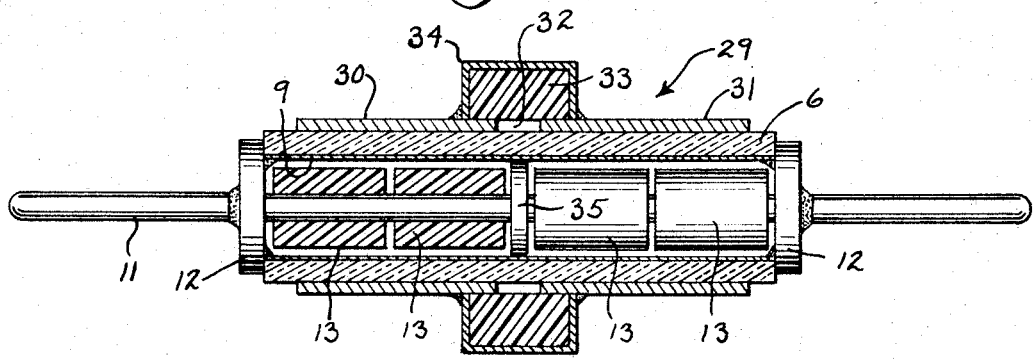
Figure 5:
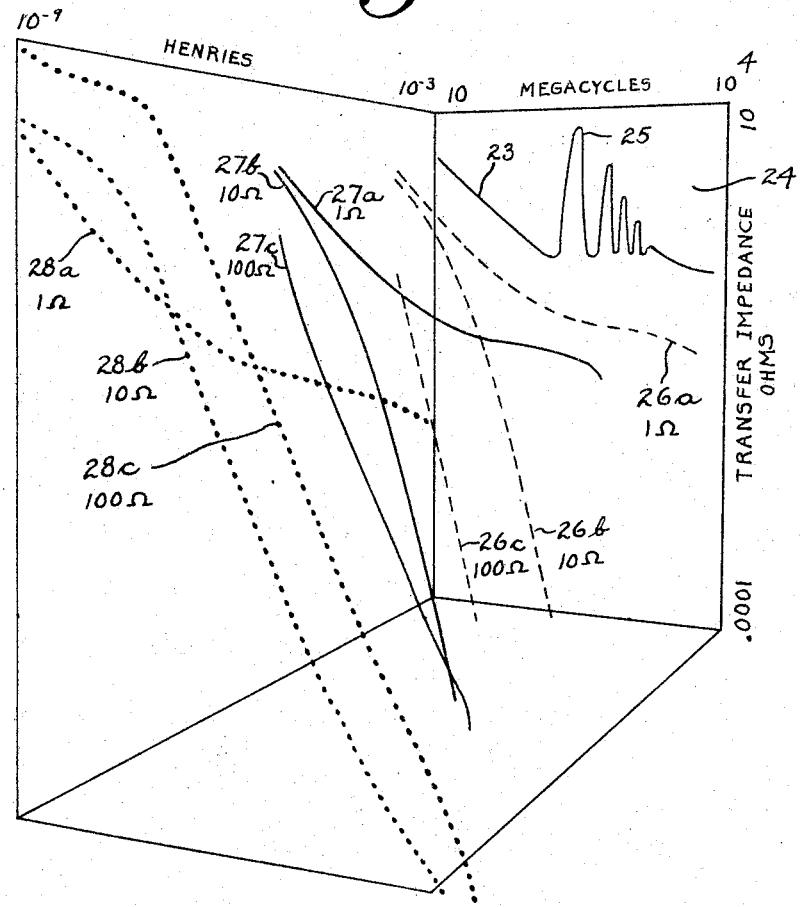
Figure 7:
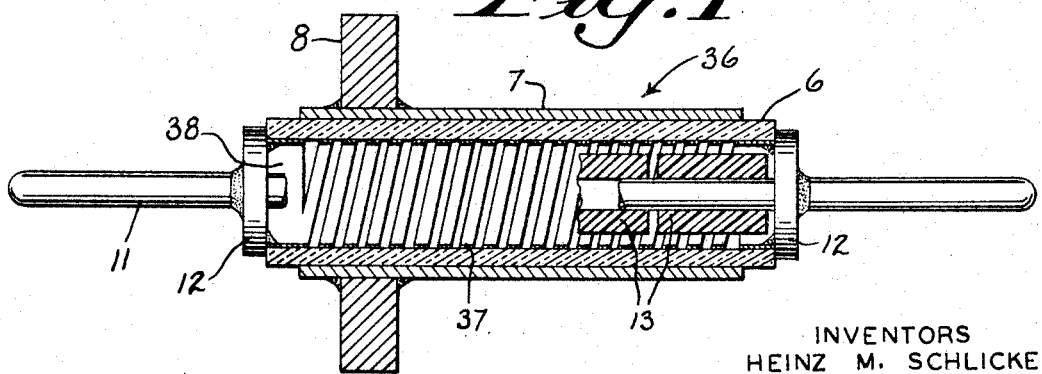
Figure 8:
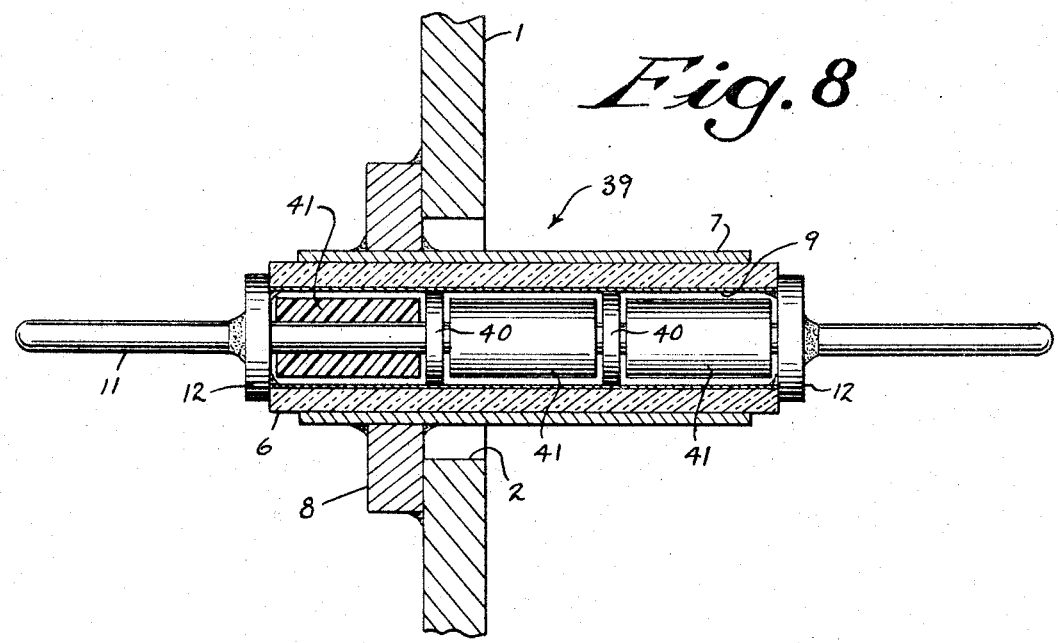
Figure 9:
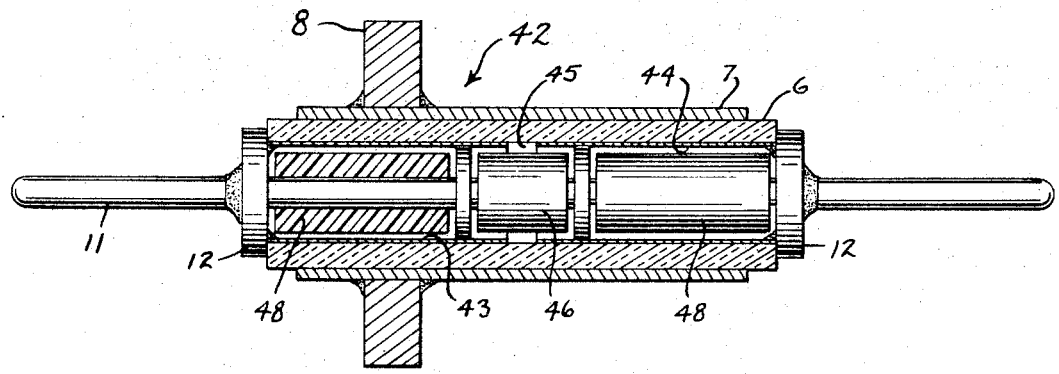

In the drawings:

FIG. 1 is a view in cross section of a tubular capacitor embodying the invention which has been inserted in an opening of a supporting chassis, FIG. 2 is a view in cross section of another capacitor embodying the invention, FIG. 3 is a view in cross section of a further embodiment of the invention, FIG. 4 is a schematic representation of a lumped circuit analogous to the capacitors of FIGS. 2 and 3, FIG. 5 is a graphical representation of electrical characteristics of capacitors embodying the invention, FIG. 6 is a view in cross section of a further embodiment of the invention in which there are two outer electrodes spaced from one another and the gap between these electrodes is encircled by a ferrite, FIG. 7 is another embodiment of the invention in which one electrode is of spiral configuration to obtain a substantial resistance value for such electrode, FIG. 8 is a further embodiment of the invention in which a number of units are cascaded one after another, and FIG. 9 is another embodiment in which the inner electrode has been subdivided into two sections with a gap therebetween.

Referring now to the particular construction of FIG. 1, there is shown a portion of a metal chassis wall 1 which may be a part of a shielding fully enclosing a circuit handling high, or ultra high radio frequencies. The enclosure will extend about the entire circuit to confine the radiations of the radio frequencies, so that they are not permitted to stray from the enclosed area and cause interference with other apparatus. It is essential that where electrical conductors enter and leave the enclosing wall 1 that some means be provided to block the travel of the radio frequencies along such conductors, for otherwise they would escape and then radiate, so as to cause interference. For this purpose so called "feed-through" capacitors are utilized at the points where the conductors pass through the wall 1, and such a capacitor must provide a very low impedance between the conductor and the wall to readily shunt the radio frequencies from the conductor to the wall.

There is illustrated in FIG. 1 an opening 2 in the wall 1 in which a capacitor 3 of the invention has been inserted. The capacitor 3 has terminal leads 4 and 5 at its respective ends, which comprise lengths of a conducting path for conveying a direct current, or low frequency current, into or out of the shielded area. Thus, the left hand conductor lead 4 may be within the electrically shielded area, and the conductor lead 5 may be on the outerside of the shielded area. Radio frequency currents within the shielded area will travel along the conductor lead 4, and it is essential to by-pass these currents from the lead 4 to the inner surface of the enclosure wall 1. For this purpose the capacitor 3 must exhibit a low transfer impedance to the radio frequencies between conductor and chassis wall.

The capacitor 3 has a tubular ceramic dielectric 6 that is preferably formed from one of the ceramic titinate materials exhibiting a high dielectric constant, to thereby secure sufficient capacitance within limited overall dimensions. These ceramic materials usually have a value of $\epsilon$ greater than a thousand in practical applications, and a dielectric constant of more than 100 distinguishes these high dielectric materials from others. On the outer cylindrical surface of the dielectric 6 is an outer capacitor electrode 7, that may comprise a fired silver paste in intimate contact with the ceramic, and a small ring-like collar 8 encircles the electrode 7 with a firm connection affording good electrical conduction. The collar 8 functions as a mounting flange for the capacitor 3 that abuts the chassis wall 1 to seal off the opening 2 around the entire circumference, so that the radio frequencies will not radiate from within the shielded area. Hence, there is no mechanical interruption in the shielding provided by the wall 1.

A second capacitor electrode 9 is deposited on the inner cylindrical wall of the tubular dielectric 6 in a position opposite the outer electrode 7. The inner electrode 9 is electrically and mechanically joined at one end to the conductor lead 4, and at its opposite end is similarly joined to the conductor lead 5. Thus, there is provided a conductive path extending through the chassis opening 2 to carry direct current, or low frequency current into or from the shielded area, such path comprising the two conductors 4, 5 and the inner electrode 9. Conversely, radio frequencies traveling along the conductor 4 will be by-passed from the inner electrode 9 to the outer electrode 7, and hence to the enclosure wall 1.

If the capacitor 3 were to function as an ideal capacitor the transfer impedance for the radio frequencies would decrease with increasing frequency, and the device would become increasingly effective as a by-pass. However, at the frequencies with which this invention is concerned a simple tubular capacitor no longer exhibits a pure capacitive characteristic. Wave lengths within the tubular dielectric body 6 are greatly foreshortened from the corresponding wave lengths in air and cavity resonances may occur for frequencies above 100 megacycles. Such resonance acts similarly as a parallel resonance, to sharply increase the transfer impedance through the capacitor. The effectiveness of the device in frequency bands near and at resonant frequencies is then lost.

To overcome resonant effects, the inner electrode 9 is made extremely thin to present a very substantial increase in resistance value over that of a usual electrode. Metallic electrodes that are sufficiently thin to provide the desired resistance may be applied by electroless plating, but other means which suggest themselves may also be adapted by those practicing the invention. It has been found that for achieving the necessary resistance for the inner electrode 9 the thickness is characterized by being less than the normal surface penetration for the high frequency currents involved when flowing in ordinary bulk conductors. Hence, although it is usually postulated that radio frequencies of 100 to 10,000 megacycles travel over the surface of a conductor, there is some depth of current penetration and normally the resistance of a conductor will be determined largely by the impedance characteristics of this thin surface layer which the current penetrates. However, in the thin capacitor electrodes of the present invention the radio frequencies traveling along the inner electrode are forced to travel in a shallower path, the depth of which is the thickness of the electrode. A greater resistance is thus obtained which is of a value adequate to produce de-resonating effects. It may be said, as a convenient manner of description, of the thin type of electrode shown in FIG. 1, that the electrode 9 is penetrable by the radio frequency currents encountered, and the inner electrode 9 may be further characterized by describing it as having a simulated skin effect, or a super skin effect, for the reason that it drives the current to the very skin of a metal conductor and thereby increases the resistance to current flow. One can anticipate, then, that the direct current resistance will be the same as the radio frequency resistance, since currents of all frequency values are restricted to the same depth of current flow.

In an instance where the amount of direct, or low frequency current to be conducted by the leads 4, 5 is of a value greater than which may be conducted by the very thin electrode 9, it will be necessary to provide a continuous conductor through the center of the tubular dielectric, such as shown in FIGS. 2 and 3. Thus, in FIG. 2 there is shown a feed-through capacitor 10 having a single central conductor 11 concentric with the tubular dielectric 6 of sufficient cross section to carry very substantial values of direct, or low frequency currents. (In FIG. 2 the parts of the capacitor 10 similar to corresponding parts of capacitor 3 in FIG. 1 have the same designating reference numerals applied thereto, and this use of like numerals also applies to other figures in the drawings.) A pair of conductive washers 12 are soldered on the feed-through conductor 11 at the ends of the dielectric 6. Suitable electrical connection, again by solder, is also made between each washer 12 and the inner capacitor electrode 9, to obtain a sturdy assembly in which radio frequency currents passing along the conductor 11 will be conducted across the first washer to the electrode 9. Since the electrode 9 is penetrable by the radio frequencies involved, the central section of the conductor 11 between the washers 12 may pick up these frequencies and conduct them to the outside of the shielded area. To minimize such a conduction a set of four ferrite beads 13 are mounted on the conductor 11. Such ferrite is inductively coupled to the conductor and presents a resistive characteristic to the impedance along the conductor when operating at the ultra and very high frequencies for which the present invention is principally intended. This coupled resistance of the ferrite beads 13 thus allows the feed-through conductor 11 to exhibit a path of negligible impedance to the direct, or low frequency currents being conducted, while at the same time presenting an impedance to radio frequencies which restricts these frequencies to conduction through the capacitor electrodes 7, 9.

In some instances the impedance to radio frequencies along the feed-through conductor 11 can be obtained by increasing the inductance of the lead without coupling to a ferrite material. Such an instance is shown in FIG. 3, wherein a capacitor 14 is shown that is in all respects like that of FIG. 2, with the exception of the character of the central section 16 of the feed-through conductor 15. A helical configuration is imparted to this central section which increases the inductance for the radio frequencies, and if desired some other configuration can be employed such as a simple sinuous shape, or merely a very thin wire of much smaller cross section than that of the exterior ends of the feed-through conductor.

In FIG. 4 a schematic circuit diagram is shown for the capacitors of FIGS. 2 and 3 in which the capacitors are likened to a four pole filter network. Since such analogies are frequently employed it is not uncommon to refer to feed-through capacitors as filters. The left hand ends of the conductors 11 and 15 are represented by the terminal 17, and the right hand ends are represented by the terminal 18. The outer electrode 7 and collar 8, which are normally grounded by the connection to the chassis, are represented by the line 19, and the series of resistances 20 and capacitances 21 represent the distributed parameters of the electrodes 7 and 9. This representation is, of course, but an analogy since the actual distributed resistance and capacitance do not constiute finite values cascaded one after another as shown in the drawing. The impedance provided either by the ferrite coupling in FIG. 2 or the helical configuration of FIG. 3 is represented by the circuit symbol 22. If the analogy of a repeated R-C filter network be made, as shown in this figure, then each resistance 20 and its succeeding capacitance 21 forms a voltage divider in which a smaller voltage appears across the capacitance than the resistance, so that the succeeding resistance and capacitance are across a minor portion of the voltage drops of the preceding resistance and capacitance. Such an arrangement effectively passes radio frequency currents to the lead 19, and presents a low radio frequency voltage level at the right hand end of the inner electrode 9. By connecting the feed-through lead to this end of the inner electrode (which connection is made through the right hand washer 12) the low voltage level is effectively presented at the output side of the capacitor, and the impedance 22 sufficiently blocks the radio frequencies to retain this desired effect. The electrode resistance may also be deemed as having a dampening effect upon currents of oscillation flowing from end to end in the electrode, thereby overcoming resonance.

The thin metallic electrodes utilized in the invention may be formed of a variety of metals such as copper, nickel, cobalt, chromium and combinations thereof such as chromium and nickel. Silver is also another candidate, although this metal may have to be deposited in such extreme thinness to obtain sufficient resistance as to make its handling impractical. However, the invention is not restricted to any particular group of materials, so long as the requisite resistance is obtained.

The particular value of resistance for a given inner electrode may vary considerably depending upon other parameters and the particular result to be achieved. In usual capacitors, in which no effort is made to obtain an electrode resistance as herein described, the value of resistance for an electrode is a negligible factor, of no more than a few milliohms. The resistance of an electrode for the present invention will be many times this value. To illustrate the general range of value for the electrode resistance a comparison can be made with the characteristic impedance $Z_c$ of the capacitor. A tubular capacitor can be investigated as a section of line, with an input at one end of its two electrodes (for example, the terminal 17 and the ground lead 19 in FIG. 4), and an output at the other end of the electrodes (the terminal 18 and the lead 19 in FIG. 4). The characteristic impedance for such a line can be stated to be dependent upon the dielectric constant $\epsilon$ and the ratio of the diameter D of the outer electrode to the diameter $d$ of the inner electrode, by the expression:

$$Z_c = \frac{138}{\sqrt{\epsilon}} \log_{10} \frac{D}{d}$$

For the resistive electrode connected to the feed-through lead, its resistance should generally not be much less than the order of magnitude of $Z_c$, and it can also greatly exceed this value. This relation has been utilized with success in working with a tubular dielectric .625 inch long that has an outer diameter of .180 inch and an inner diameter of .125 inch. These dimensions roughly correspond to commercial size feed-through capacitors utilizing various other methods for overcoming deficiencies created by internal resonance, and they are cited here as being representative of one size of manufacture in conformance with the invention. For the above dimensions and a dielectric constant of 2,500 the value of $Z_c$ is .435, and the resistance for the very thin electrode should preferably not be less than this value. The range of values for the electrode resistance can be substantial, and they may exceed the characteristic impedance by several hundred times.

To illustrate the effects of the resistance of the thin electrode and its interrelation with other parameters reference is now made to FIG. 5. The three coordinate diagram of FIG. 5 relates the frequency (scaled along the horizontal axis in values from ten to ten thousand megacycles) with the transfer impedance (scaled along the vertical axis from ten ohms downwardly to .0001 ohm) and the value of the inductance of the center section of the feed-through conductor (scaled in henries from $10^{-3}$ to $10^{-9}$ along the forwardly extending axis). For reference purposes a trace 23 in the rear vertical plane 24 shows the response of a plain tubular capacitor with frequency. The peaks 25 in the value of transfer impedance are due to resonant conditions, in which the plain tubular capacitor fails to behave as a true capacitor. Thus, from about 100 megacycles upward a simple tubular capacitor is inadequate as a feed-through device.

Referring now to the family of curves 26a, 26b and 26c at the rear of the diagram, they are for a capacitor having a relatively large inductance for the central portion of the feed-through conductor and the three curves are for resistance value of the thin inner electrode of one ohm, ten ohms and one hundred ohms respectively. For each resistance the resonant peaks are eliminated and for the larger values of resistance the device presents a smaller transfer impedance than an ideal capacitor for all values of frequency.

The next family of curves 27a, 27b and 27c are for a lesser amount of inductance for the feed-through conductor, and again the curves correspond to one ohm, ten ohms and one hundred ohms respectively. The transfer impedance for each ohmage is slightly greater than in the curve family 26, and at the higher frequencies the ten ohm electrode begins to provide a smaller transfer impedance than the one hundred ohm electrode.

The last family of curves 28a, 28b and 28c again correpond to one, ten and one hundred ohms respectively, and for this family a still smaller inductance was selected for the central feed-through conductor. Here it is seen that the one hundred ohm electrode is not as effective as the lesser values, and that for the smaller frequency values the one ohm electrode is superior.

For the capacitors used in securing the data illustrated in FIG. 5 the dimensions were: length of ceramic tube .625 inch, outer diameter .180 inch, inner diameter .150 inch and dielectric constant 1700. The characteristic impedance, by the foregoing formula, is .266 and thus FIG. 5 gives an indication of the effects of change in resistance with respect to characteristic impedance.

Referring now to FIG. 6, there is shown a capacitor 29 that is a modification of the form shown in FIG. 2. The first modification consists of having the outer electrode reside in two separate, axially spaced electrodes 30 and 31 that have a gap 32 therebetween. Encircling the gap 32 is a ferrite ring 33 with a conductive coating 34. The coating 34 may comprise a fired silver paste forming an integral continuation of the electrodes 30 and 31. There is also provided, as a second modification, an internal conductive disc 35 that joins the center point of the lead through conductor 11 with the center point of the very thin internal electrode 9. By dividing the outer electrode into a pair of electrodes 30, 31 the capacitor is, in effect, subdivided so as to have the characteristic of cascading two of the devices of FIG. 2 one after the other. The disc 35 electrically ties the end of the first capacitor section to the feed-through lead and the ferrite ring 33 is coupled to this portion of the lead. Magnetic fields within the dielectric 6 will extend between the ends of the outer electrodes 30 and 31 and by locating the ferrite 33 at the gap 32 effective coupling is obtained. The result of the construction of FIG. 6 is to obtain performance superior to the embodiment of FIG. 2.

A further form of the invention is shown in FIG. 7, wherein the inner electrode is of a thicker layer, but has been shaped as a spiral to produce the requisite resistance along its length. The capacitor 36 has a ceramic tube 6 with outer electrode 7 and mounting collar 8, as in prior discussed embodiments. It also has a feed-through conductor 11 like that of FIG. 2 with coupled ferrite beads 13 and assembly washers 12. A part of the central portion of the conductor 11 and of the beads 13 has been broken away to show the spiral form of inner electrode 37 formed on the inner surface of the ceramic tube 6. The electrode 37 has a circular terminal end 38 at the left which is electrically connected with the left hand washer 12. From the terminal end 38 the electrode 37 extends in a number of helical turns across the inside of the ceramic 6 to a connection with the right hand washer 12. By provision of spiralled turns a resistance can be developed for the inner electrode while retaining a relatively thick layer for the electrode. A highly conducting medium such as silver can then be utilized without resort to a film of extreme thinness which might otherwise be difficult to work with. The spiral form of electrode will be permeable to the radio frequencies by reason of the gaps between turns, and accordingly ferrite beads or other appropriate means, should be used for the central portion of the feed-through conductor.

Referring now to FIG. 8, there is shown a capacitor 39 that presents another form of cascading, which varies from that in FIG. 6. A pair of conductive discs 40 are placed inside the tubular dielectric 6, each of which makes an electrical connection between the feed-through conductor 11 and the thin inner electrode 9. The discs 40 thus sub-divide the inner electrode 9 and the portion of the conductor 11 between the end washers 12 into three similar sections, and for each section a ferrite bead 41 is inserted over the conductor 11. As a result, the feed through conductor 11 is connected at several points along its length to the distributed resistance-capacitance voltage dividing network of the electrode, so that the conductor 11 is tied to the reduced voltage levels along the electrode. Improved performance can be obtained by employment of this embodiment.

In FIG. 9 a form of the invention 42 is shown that is a variation from that of FIG. 6. Here the thin inner electrode is subdivided into a pair of electrodes 43 and 44 which are separated by a circumferential gap 45. A ferrite bead 46 encircling the feed-through conductor 11 is aligned with the gap 45, and a conductive disc 47 is disposed on each side of the bead 46. Each disc 47 makes electrical contact between the conductor 11 and its associated inner electrode 43 or 44. Ferrite beads 48 are placed on the opposite sides of the discs 47 to surround the remaining lengths of the conductor 11 within the tubular dielectric 6. Again, enhanced performance characteristics can be gained by the modification in structure.

In the invention a feed-through capacitor is provided which has a tubular dielectric with outer electrode and mounting collar that forms with the chassis, in which it is to be mounted, an effective shield for dividing one end of the feed-through conductor from the other end. The capacitor must function to retain the two ends of the conductor electrically decoupled with respect to the radio frequencies, and for this purpose a resistive inner electrode is provided which overcomes resonant effects that may otherwise impair the intended function of the device.

We claim:

1. In a by-pass capacitor for use at radio frequencies above 100 megacycles the combination comprising: a tubular ceramic dielectric having a dielectric constant greater than 100, said dielectric being of dimensions susceptible to internal resonance for some of the frequencies to be by-passed by the capacitor; a conductor extending into said tubular dielectric for conducting direct and low frequency currents; a thin inner metallic electrode on the inner surface of said dielectric which is in electrical contact with said conductor and having a restricted thickness to provide an electrode that is penetrable by radio frequencies to be by-passed through the capacitor, such restricted thickness presenting a resistance distributed along the length of said inner electrode that diminishes radio frequency voltage at the end of said electrode opposite the entry of said conductor; an outer electrode on the outer surface of said dielectric which is of very small resistance compared to that of said inner electrode, said outer electrode being opposite said inner electrode to provide capacitance distributed along the dielectric; mounting means for said capacitor in electrical connection with said outer electrode; and ferrite encircling said conductor along lengths thereof within the ends of the inner electrode for presenting impedance to radio frequencies traveling along such lengths of the conductor.

2. In a by-pass capacitor for use at radio frequencies above 100 megacycles the combination comprising: a tubular ceramic dielectric of dimensions susceptible to internal resonance for some of the frequencies to be by-passed by the capacitor; a conductor extending into said tubular dielectric for conducting direct and low frequency currents; a thin inner metallic electrode on the inner surface of said dielectric which is in electrical contact with said conductor and having a restricted thickness to provide an electrode with a skin-effect resistance distributed along the electrode at least as great as that of the characteristic impedance of the capacitor as measured by the relationship $$Z_c = \frac{138}{\sqrt{\epsilon}} \log_{10} \frac{D}{d}$$

said resistance dampening radio frequency current along the electrode to diminish internal resonances; an outer electrode on the outer surface of said dielectric which is of very small resistance compared to that of said inner electrode, said outer electrode being opposite said inner electrode to provide capacitance distributed along the dielectric; and an impedance for said conductor along lengths thereof beyond an initial connection between the conductor and inner electrode for presenting high impedance to radio frequencies traveling along such lengths of the conductor.

3. In a by-pass capacitor for use at radio frequencies above 100 megacycles the combination comprising: a tubular ceramic dielectric of dimensions susceptible to internal resonance for some of the frequencies to be by-passed by the capacitor; a conductor extending into said tubular dielectric for conducting direct and low frequency currents; a thin inner metallic electrode on the inner surface of said dielectric which is in electrical contact with said conductor and having a restricted thickness less than that of normal current penetration for radio frequencies to be by-passed to provide a substantial resistance distributed along the inner electrode that diminishes radio frequency voltage at the end of said electrode opposite the entry of said conductor to thereby diminish internal resonances; a pair of outer electrodes on the outer surface of said dielectric closely spaced axially from one another and which are of very small resistance compared to that of said inner electrode, said outer electrodes being opposite said inner electrode to provide capacitance distributed along the dielectric; a connection between said conductor and said inner electrode at a point axially corresponding to the space between said outer electrodes; and ferrite encircling said dielectric at the spacing between said outer electrodes.

4. In a by-pass capacitor for use at radio frequencies above 100 megacycles the combination comprising: a tubular ceramic dielectric of dimensions susceptible to internal resonance for some of the radio frequencies to be by-passed; a conductor extending through the tubular dielectric for conducting direct and low frequency currents; a thin inner metallic electrode on the inner surface of said dielectric having a restricted thickness less than that of normal current penetration for radio frequencies to be by-passed to provide a substantial resistance distributed along the inner electrode that diminishes radio frequency voltage at the end of said electrode opposite the entry of said conductor to thereby diminish internal resonances, said electrode being subdivided by a circumferential gap; a ferrite encircling the conductor which is disposed adjacent said gap; and an outer electrode on the outer surface of the dielectric of resistance value very small compared to that of said thin inner electrode said outer electrode being opposite said inner electrode to provide capacitance distributed along the dielectric.

5. In a capacitor for by-passing radio frequencies in the megacycle regions the combination comprising: a tubular dielectric body of a high dielectric constant ceramic material that is of dimensions susceptible to internal resonance at some of the frequencies to be by-passed; a conductor having an input side extending into said tubular dielectric body for conducting direct and low frequency currents and from which radio frequency currents are to be by-passed through the dielectric body; an outer electrode on the outer surface of said dielectric body which is of relatively small resistance; a mounting for the capacitor electrically joined with said outer electrode; an inner electrode on the inner surface of said dielectric body which is in electrical contact with said conductor, opposite said outer electrode to have capacitance distributed along the dielectric, and penetratable by radio frequencies to be by-passed through the dielectric body; such penetratable electrode presenting resistance distributed along its length that reduces the radio frequency voltage level at the end of the inner electrode opposite the input side of said conductor and maintaining a low transfer impedance through the dielectric body for radio frequencies to be by-passed to alleviate internal resonance.

6. In a capacitor for by-passing radio frequencies in the megacycle regions the combination comprising: a tubular dielectric body of a high dielectric constant ceramic material that is of dimensions susceptible to internal resonance at some of the frequencies to be by-passed; a conductor having an input side extending into said tubular dielectric body for conducting direct and low frequency currents and from which radio frequency currents are to be by-passed through the dielectric body; an outer electrode on the outer surface of said dielectric body which is of relatively small resistance; a mounting for the capacitor electrically joined with said outer electrode; an inner electrode on the inner surface of said dielectric body which is in electrical contact with said conductor, disposed opposite said outer electrode to have capacitance distributed along the dielectric, and of a resistance distributed along its length that is at least as great as a characteristic impedance measured by the relationship $$Z_c = \frac{138}{\sqrt{\epsilon}} \log_{10} \frac{D}{d}$$

such resistance dampening radio frequency currents within the capacitor for diminishing internal resonance at the radio frequencies to be by-passed.

References Cited

UNITED STATES PATENTS

| | | | |
|---|---|---|---|
| 2,759,155 | 8/1956 | Hackenberg | 333—79 |
| 2,973,490 | 2/1961 | Schlicke | 333—79 |
| 2,994,048 | 7/1961 | Schlicke | 333—79 |
| 3,002,162 | 9/1961 | Garstaug | 333—1 |
| 3,007,121 | 10/1961 | Schlicke | 333—79 |
| 3,023,383 | 2/1962 | Schlicke et al. | 333—79 |
| 3,035,237 | 5/1962 | Schlicke et al. | 333—79 |
| 3,200,355 | 8/1965 | Dahlen | 333—79 |
| 3,243,738 | 3/1966 | Schlicke et al. | 333—79 |

HERMAN KARL SAALBACH, *Primary Examiner.*

ELI LIEBERMAN, *Examiner.*

C. B. BARAFF, *Assistant Examiner.*